United States Patent [19]
Wiseman

[11] 3,852,380
[45] Dec. 3, 1974

[54] WATER LEVEL INDICATOR AND CONTROL
[75] Inventor: Woodrow W. Wiseman, Columbus, Ohio
[73] Assignee: Westinghouse Electric Corporation, Pittsburgh, Pa.
[22] Filed: May 24, 1973
[21] Appl. No.: 363,773

[52] U.S. Cl. .................. 261/27, 73/308, 73/321, 116/118 R
[51] Int. Cl. ............................................. B01f 3/04
[58] Field of Search ........... 261/26, 27; 340/244 D; 73/308, 307, 321; 116/118 R

[56] References Cited
UNITED STATES PATENTS

| | | | |
|---|---|---|---|
| 2,158,936 | 5/1939 | Hennings | 73/321 |
| 2,348,362 | 5/1944 | Rudolf | 73/305 X |
| 2,611,270 | 9/1952 | Sciford | 73/321 |
| 3,253,820 | 5/1966 | Seill | 261/27 |
| 3,536,032 | 10/1970 | Ridding | 116/118 R |
| 3,598,370 | 8/1971 | Hoag | 261/26 |

Primary Examiner—J. M. Meister
Attorney, Agent, or Firm—E. C. Arenz

[57] ABSTRACT

A float actuated water indicator and control assembly is installed in a portable humidifier of the type having a removable water container at the bottom of the cabinet in which a drum having a porous circumferential cover is rotated with a portion thereof submerged so that the water is raised out of the container to be dispersed in an air flow created by a fan. The float is connected by a line to a spring biased indicator drum mounted on an independent sub-assembly frame near the top of the cabinet so that water level indicia on a part of its circumference can be viewed through an aperture in the top of the humidifier cabinet.

The sub-assembly frame includes a lever-actuated limit switch mounted so that as the indicator drum reaches a position corresponding to a low water level in the water container a tab extending from the hub of the indicator trips the switch which in turn electrically deenergizes the fan and water dispersion drum motors and electrically energizes a light indicating refill of the water container is necessary.

When the indicator drum is in the completely biased position, the flexible line is retained in a groove in the drum indicator by a bead positioned slightly below an aperture in the sub-assembly frame through which the line passes.

9 Claims, 5 Drawing Figures

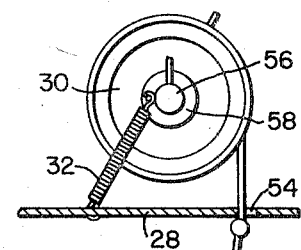
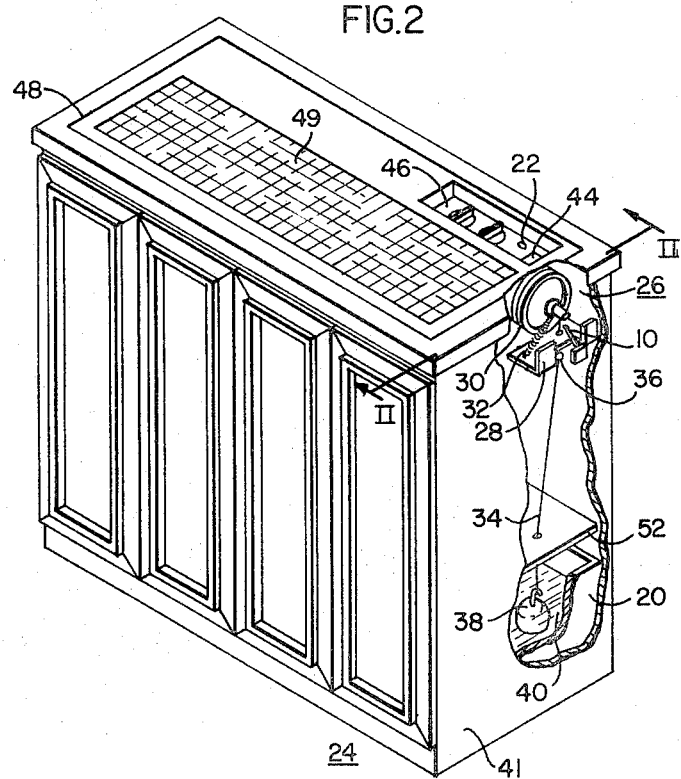
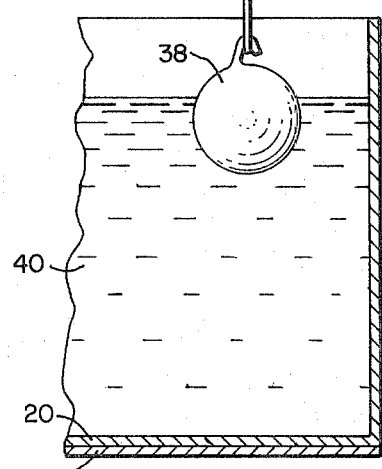
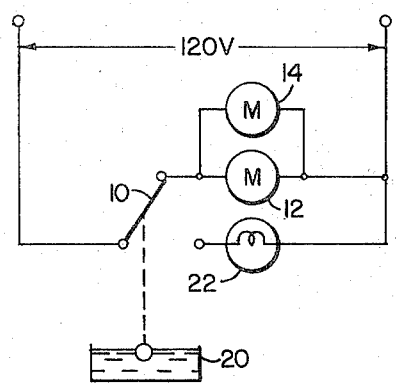

WATER LEVEL INDICATOR AND CONTROL

BACKGROUND OF THE INVENTION

1. Field of the Invention

This invention pertains to the art of water level indicators and controls for use in portable humidifiers.

2. Description of the Prior Art

Various features of liquid level indicators have been taught in previous patents such as: U.S. Pat. Nos. 1,188,793; 2,158,936; 3,088,318. However, of the water level indicators used in portable humidifiers of which the applicant is aware, all employ various arrangements of rigid or semi-rigid linkages to transmit motion from a float device to an indicator device. The assemblies usually include several wire or flat-strap type linkages, pivot bushings and push-on retainer clips or washers. These arrangements are costly and require care in assembly to prevent excessive binding in operation. In addition, since these linkages are rigid, special provisions are required in order to remove the water container, i.e., the float and linkage must be constructed so that they can be raised or bent out of the way of the container. Several types have provisions to lock the linkage in the up position which adds cost to the humidifier.

SUMMARY OF THE INVENTION

In accordance with the invention, the portable humidifier has a removable water container in the bottom of the cabinet and a float connected by a flexible line to a water level indicator of the drum type mounted on a subassembly frame near the top of the cabinet. The drum is biased toward a full water level position, and means are provided to prevent disengagement of the line from the drum when the float is moved to a position above that position corresponding to a full water level position.

Since the connection between the float and the drum indicator is a flexible line the prior art requirement of precise alignment of the float with respect to an indicator is no longer a problem. The float is suspended into the container at a position nearer the center of the humidifier than the indicator so that it does not interfere with the container walls. Removal of the water container is accomplished simply by sliding the container from the cabinet.

DESCRIPTION OF THE DRAWINGS

FIG. 1 is a simplified partly schematic view of a circuit arrangement according to the invention;

FIG. 2 is a partly broken isometric view of a portable humidifier having the indicator control arrangement of the invention;

FIG. 3 is an enlarged cross-sectional view of the arrangement taken along the line II—II of FIG. 1;

DESCRIPTION OF THE PREFERRED EMBODIMENT

Figure 4:
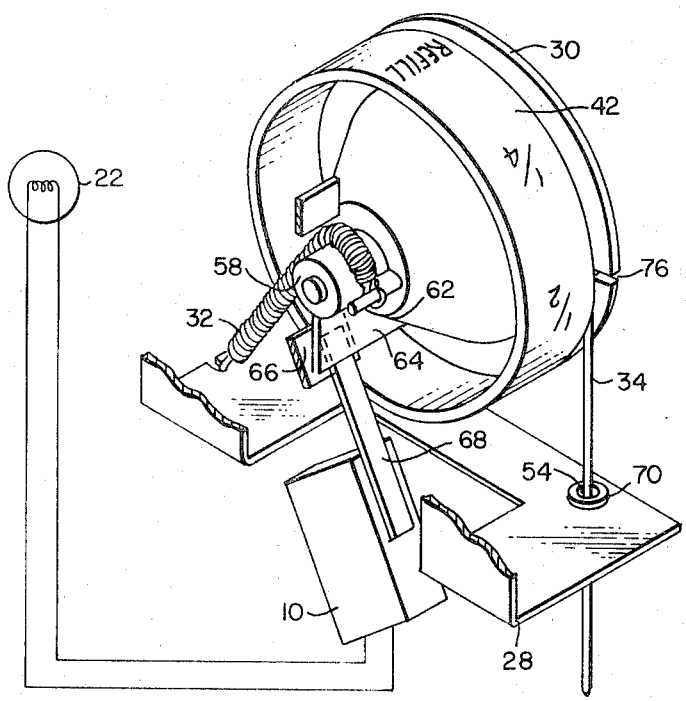
FIG. 4 is a partly broken isometric view of the indicator arrangement in the refill position.

FIG. 1 is a simplified circuit arrangement of a portable humidifier wherein during normal operation switch 10 (controlled by water level) is in the position shown in FIG. 1 and thus electrically energizes fan motor 12 and the dispersion drum motor 14. However, when a condition is reached where the water level in the reservoir 20 reaches a peredetermined refill level, switch 10 is moved to the opposite position energizing refill light 22 and deenergizing the fan and dispersion drum motor.

Referring to FIG. 2, refill light 22 and switch 10 are shown in their preferred locations in the portable humidifier 24. Switch 10, mounted on assembly frame 28, is a component of the indicator control assembly 29. The indicator control assembly also includes the following parts shown in FIGS. 2 and 3: indicator drum 30, biasing spring 32, line connector 34, retaining bead 36, and float 38. The float is shown in the water 40 in the water container 20. The indicator drum is located near the top of the cabinet 41 so that the water level indicia 42 (FIG. 4) on the drum circumference can be seen through the viewing window 44 located in the control panel 46. The control panel is located at the rear of the cabinet top so that the grille work 49 is sufficiently large to allow adequate dispersion of humidified air. This in turn requires the indicator to be near the rear of the cabinet also.

As shown in FIG. 3, the connecting line 34 is connected to the float 38 and passes through an aperture 50 located in the chassis 52 so that the float will suspend into the container without interfering with the container wall. It then passes through a second aperture 54 in the assembly frame 28 and is trained in groove 54 of the indicator drum 30 which is rotatably held on axle 56. Attached to an extended hub 58 of drum 30 is one end of the biasing spring 32, the other end of which is attached to the assembly frame 28.

In FIG. 3 the container is shown filled to its maximum desired level. As the water is used by the humidifier, the water level and correspondingly the float 38 move in a downward direction as shown in FIG. 3, pulling the line 34 and in turn rotating the drum 30. The spring 32 resists the rotation of the drum sufficiently to maintain tension on the connecting line 34 but not enough to prevent the float from moving with the water level.

Since connecting line 34 is flexible, the container 20 can simply be slid away from its position on the cabinet bottom 60 for removal, while ignoring the float and line. In addition, the flexibility of line 34 accommodates the vertical misalignment shown in FIG. 3 which results from the indicator being placed under the control panel 46 near the rear of the cabinet, and the float being suspended into the container in a more central cabinet position.

In FIG. 4, the indicator drum 30 is shown in the refill position, that is, the position at the opposite end of the indication range from that shown in FIGS. 2 and 3. It assumes this position when the float 38 is at the designated refill position near the bottom of the reservoir 20 (not shown). This causes the biasing spring 32 to be stretched to its most extended position wrapping partly around the extended hub 58 of the indicator drum 30. Spring 32 is hoooked on to pin 62 which is made as part of the extended hub. Rotation of the wheel is positively stopped at this position when tab 64, a part of the extended hub 58, contacts tab 66 which extends toward drum 30 from base frame 28 of which it is a part. During rotation in the refill direction, clockwise in FIG. 4, tab 64 contacts trip arm 68 of switch 10 shortly before stopping against frame tab 66. This trips switch 10 which then electrically energizes the refill indicator light 22, and electrically deenergizes all other electrical functions of the humidifier as shown in FIG. 1.

FIG. 4 also illustrates the arrangement employed in the preferred embodiment to retard frictional wear of line 34 by inserting a plastic eyelet in aperture 54 through frame 28. A similar eyelet is used in aperture 50, FIG. 3.

Figure 5:
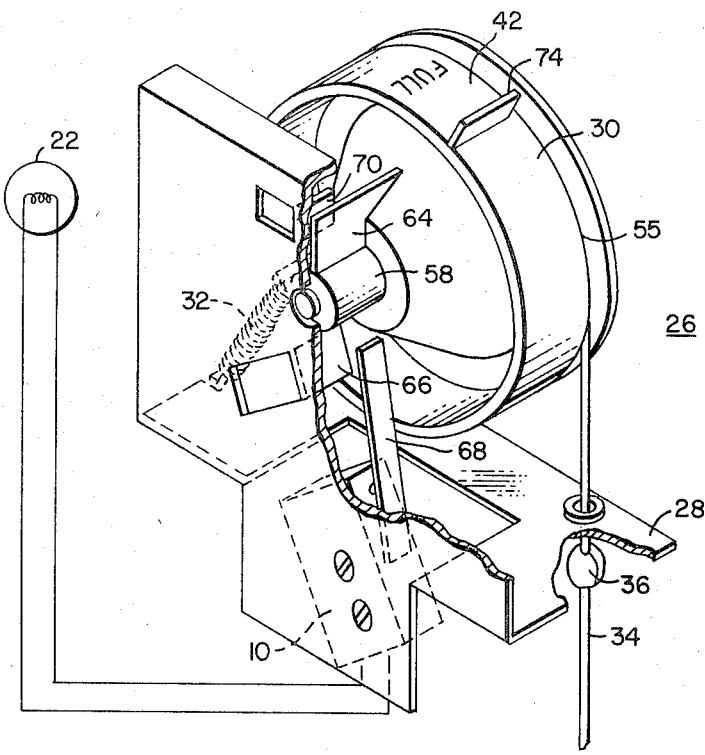
FIG. 5 is a partly broken isometric view of the indicator arrangement in the full position.

In FIG. 5, the indicator drum 30 is shown in the full position which corresponds to the position shown in FIGS. 2 and 3. Rotation of the drum in this direction is positively stopped when hub tab 64 contacts tab 70 which extends toward the hub from assembly frame 28 of which it is a part.

A tab 74 is shown extending outwardly from the circumference of drum 30. This tab along with the cut 76 in the rim of groove 55 is used as a reference in applying the indicia 42 to the circumference of drum 30. The cut also is used to connect line 34 to the drum.

Switch 10 is shown in FIG. 5 with trip arm 68 in the position it normally assumes in conditions of operation of the humidifier except the refill condition.

The bead 36 (which may be a split shot as used for fishing) is attached to line 34 slightly below frame 28 as shown in FIG. 5 so that if during shipment float 38 would be put in a position which would relieve the tension on line 34, bead 36 would contact the bottom of frame 28. This would limit a slacking condition in the line which could occur since drum 30 is stopped from further rotation by spring 32 holding drum 30 against tab 70. If such a slacking condition did occur, line 34 could be dislodged from V-groove 55 in drum 30 causing the indicator control assembly to malfunction. This feature is particularly valuable during manufacturing since all of the parts of the indicator assembly 26 are mounted to base frame 28 enabling the indicator assembly to be manufactured, assembled and tested as an independent component prior to installation in the humidifier.

Alternate embodiments of the invention could include a counterweight to bias the drum indicator in place of the spring. The float could be a resealable plastic bag partly filled with water. Instead of a Dacron cord the line could be a light metal wire or a thin strip of flexible Mylar. The indicia on the indicator and the inside diameter of the V-groove can be varied to accommodate various containers and various standards of water level.

I claim:

1. In a portable humidifier;
a cabinet;
a removable water container in the lower part of said cabinet;
electrically energized means for creating a flow of air adapted to be humidified through said cabinet;
a water level indicator and control assembly in the upper part of said cabinet including movable means carrying water level indicia presented thereon, means biasing said movable means toward a full water level indication, means limiting movement of said movable means beyond said full water level indication, and switch means located to be operated by movement of said movable means to a position corresponding to a low water condition to control said electrically energized means;
a float;
flexible line means connected to said movable means at one end and connected to said float means at the other end, said line extending in a direction from said movable means that movement of said line in said lastmentioned direction opposes said biasing means; and
stop means on said line means, spaced apart from said float, and cooperating abutment means on said cabinet, for maintaining the portion of said line between said stop means and said movable means in tension and thereby preventing disengagement of said flexible line from said movable means when said float is moved to positions corresponding to positions in a direction above the position of full water level indication.

2. In a humidifier according to claim 1 including:
a bracket for mounting said movable means, said switch means, and said biasing means in a separate assembly.

3. In a humidifier according to claim 1 wherein:
said movable means includes a rotatable drum indicator having water level indicia presented on a part of the circumference thereof, said drum being positioned so that said indicia can be read from without said cabinet.

4. In a humidifier according to claim 3 wherein:
said biasing means comprises a spring biasing said drum in a direction of rotation toward said full water level indication.

5. In a humidifier according to claim 1 wherein:
said abutment means comprises fixed structure between said movable means and said container including an aperture through which said line passes; and
said stop means is fastened on said line at a location that said stop means abuts said fixed structure about said aperture when said float is moved to said positions corresponding to positions above full water level.

6. In a humidifier according to claim 1 including:
structure including an upper, and a lower, aperture, offset from each other relative to a vertical line; and
said flexible line passes through both said apertures.

7. In a humidifier according to claim 2 wherein:
said movable means comprises a rotatable drum carrying stop means; and
said bracket includes abutment means projecting to interfere with said stop means and prevent rotation of said drum substantially beyond either a full indication position or a refill indication position.

8. In a humidifier according to claim 7 including:
switch means carried by said bracket and positioned to be engaged by said stop means in a position corresponding to a refill position to deenergize said electrically energized means.

9. In a portable humidifier including a cabinet having a removable water reservoir in the lower part of the cabinet, and electrically energized means for effecting a flow of air through said cabinet and the humidification of said air;
a water level indicator and control assembly in the upper part of said cabinet, said assembly including a rotatable drum indicator positioned so the water level indications can be read from without said cabinet, switch means operated by movement of said indicator to control said electrically energized means in accordance with water level, means biasing said indicator toward a full water level indication;

a float;

flexible line means wound around at least a part of said drum and connecting said drum to said float, said flexible line means permitting said float to be lifted out of said reservoir to allow removal of said reservoir from said cabinet; and stop means on said line means, spaced apart from said float, and cooperating abutment means on said cabinet for sufficiently limiting movement of said flexible line portion between said stop means and said drum in an upward direction when said float is lifted above a full level position that said line remains in tension and in position on said drum.

* * * * *